(12) United States Patent
Anguelov et al.

(10) Patent No.: US 9,098,741 B1
(45) Date of Patent: Aug. 4, 2015

(54) DISCRIMINITIVE LEARNING FOR OBJECT DETECTION

(71) Applicant: Google Inc., Mountain View, CA (US)

(72) Inventors: Dragomir Anguelov, Santa Monica, CA (US); Alexander Toshkov Toshev, San Francisco, CA (US); Deva K. Ramanan, Irvine, CA (US); Xiangxin Zhu, Irvine, CA (US)

(73) Assignee: Google Inc., Mountain View, CA (US)

( * ) Notice: Subject to any disclaimer, the term of this patent is extended or adjusted under 35 U.S.C. 154(b) by 344 days.

(21) Appl. No.: 13/837,621

(22) Filed: Mar. 15, 2013

(51) Int. Cl.
*G06K 9/62* (2006.01)
*G06K 9/00* (2006.01)

(52) U.S. Cl.
CPC ... *G06K 9/00536* (2013.01); *G06T 2207/20081* (2013.01)

(58) Field of Classification Search
None
See application file for complete search history.

(56) References Cited

U.S. PATENT DOCUMENTS

2014/0328537 A1* 11/2014 Schertler et al. .............. 382/160
2014/0348391 A1* 11/2014 Schweid et al. .............. 382/105

OTHER PUBLICATIONS

Object Detection with Discriminatively Trained Part Based Models; Felzenszwalb et al; IEEE Transactions on Pattern Analysis and Machine Intelligence; retrieved from internet: http://www.ics.uci.edu/~dramanan/papers/tmp.pdf; 2010; (retrieved on Mar. 15, 2013; 20 pages).
Steerable Part Models; Pirsiavash et al; Conference on Computer Vision and Pattern Recognition; retrieved from internet: http://www.ics.uci.edu/~dramanan/papers/steerable_2012.pdf; 2012; (retrieved on Mar. 15, 2013); 8 pages.

* cited by examiner

*Primary Examiner* — Bhavesh Mehta
*Assistant Examiner* — Andrew Moyer
(74) *Attorney, Agent, or Firm* — Fish & Richardson P.C.

(57) ABSTRACT

Methods, systems, and apparatus, including computer programs encoded on a computer storage medium, for object detection are disclosed. Methods can include, for each of a plurality of locations in one or more positive images, image filters are identified, each image filter representing visual features of a location in a positive image (e.g., an image that includes a particular object). Positive location feature scores and negative location feature scores are determined for locations within images. A positive location feature score is based on a similarity between the image filter and feature values for a positive image. A negative location feature score is determined based on a similarity between the image filter and feature values for a negative image. A distinctive location is identified based on the positive and negative location feature scores, and distinguishing feature values for identifying the particular object are identified for the distinctive location.

18 Claims, 5 Drawing Sheets

DISCRIMINITIVE LEARNING FOR OBJECT DETECTION

BACKGROUND

This specification relates to data processing object detection.

The Internet provides an opportunity for users to share images and for content providers to disseminate information by way of images. Identification of particular objects in images helps to index the images, which in turn, helps users locate images that include a particular object. For example, a user searching for an image of a car may use an image search system to locate images of cars by entering a search query by way of text, audio, or image data. In turn the search system can identify images that have been identified as images of cars.

SUMMARY

An object identification model for a particular object is created by identifying locations of distinguishing feature values in images that include the particular object. Image feature values represent visual characteristics of an image, and the distinguishing feature values are image feature values, at particular locations of images, that can be used to distinguish between images that include the particular object and images that do not include the particular object.

The distinguishing feature values can be identified by evaluating positive images (e.g., images that have been deemed to include the particular object) and negative images (e.g., images that have been deemed to not include the particular object) using a set of image filters (e.g., a set of image feature values extracted from positive images). For example, measures of similarity between an image filter and image feature values for each of the positive images and the negative image can be computed. The image location at which a threshold difference between the measures of similarity for the positive images and the measures of similarity for the negative images exists can be identified as a distinctive location for positive images. In turn, a set of image feature values corresponding to the distinctive location can be selected as a set of distinguishing feature values for identifying the particular object in images.

Additional distinctive locations and distinguishing feature values can be identified based on the images having image feature values matching previously selected distinguishing feature values. As described below, the distinguishing feature values and the distinctive locations can be used to generate split rules for a decision tree that can be used to determine whether an image includes the particular object for which the decision tree was trained. Additionally, the split rules can be used to initialize a deformable parts mixture model that can also be used for object identification.

In general, one innovative aspect of the subject matter described in this specification can be embodied in methods that include the actions of identifying a set of images for a root node of a decision tree, visual characteristics of each image being represented by image feature values for the image, the set of images including one or more positive images that have been deemed to include a particular object and one or more negative images that have been deemed to not include the particular object; identifying, for each of a plurality of locations in one or more positive images from the set of images, image filters, the image filter for each location representing visual features of the location in positive images; determining, for each of two or more image locations, a positive location feature score and a negative location feature score, the positive location feature score being determined based on a measure of similarity between the image filter and the positive image feature values for each of two or more different positive images, the negative location feature score being determined based on a measure of similarity between the image filter and the negative image feature values for each of two or more different negative images; identifying a first distinctive location from the two or more image locations, the first distinctive location being identified based on a difference between the positive location feature score at the first distinctive location and the negative location feature score at the first distinctive location meeting a difference threshold; and selecting a first set of distinguishing feature values for identifying the particular object based on image feature values for the first distinctive location. Other embodiments of this aspect include corresponding systems, apparatus, and computer programs, configured to perform the actions of the methods, encoded on computer storage devices.

These and other embodiments can each optionally include one or more of the following features. Methods can include the actions of creating a first positive descendent node of the decision tree, the first positive descendent node being created to include a proper subset of the set of images, the proper subset including the images for which image feature values, at the distinctive location, have at least a threshold similarity to the first set of distinctive feature values for the first distinctive location; and creating a first negative descendent node of the decision tree, the first negative descendent node being created to include a proper subset of the set of images, the proper subset including at least the images not included in the first positive descendent node.

Methods can include the actions of identifying a second set of distinguishing feature values for identifying the particular object, the second set of distinguishing feature values being associated with a second distinctive location of the images; creating a second positive descendent node that includes a proper subset of the images from the first positive descendent node, the proper subset included in the second positive descendent node being images having both: image feature values, at the first distinctive location, that have at least a threshold similarity to the first set of distinctive feature values for the first distinctive location; and image feature values, at the second distinctive location, that have at least a threshold similarity to the second set of distinguishing features.

Methods can include the actions of receiving a set of image feature values for a candidate image; determining that image feature values for the first distinctive location of the candidate image match the first set of distinguishing feature values; determining that image feature value for the second distinctive location of the candidate image match the second set of distinguishing feature values; and classifying the candidate image as an image of the particular object based, at least in part, on the determination that the first set of distinguishing feature values and the second set of distinguishing feature values are both matched by image feature values for the candidate image.

Methods can include the action of initializing a deformable parts mixture model based on the first set of distinguishing feature values. Initializing the deformable parts mixture model can include identifying the first set of distinguishing feature values as a mixture component for the deformable parts mixture model; and identifying the first discriminative image location as a reference location for the mixture component.

Particular embodiments of the subject matter described in this specification can be implemented so as to realize one or more of the following advantages. An object identification decision tree can be trained in a discriminative manner such that a most discriminative feature (or a feature providing at least a threshold level of discrimination) for distinguishing positive images from negative images can be used to train the decision tree. The object identification decision tree enables classification of a candidate image as a negative image when one or more distinguishing feature values at one or more particular image locations are not matched by the image feature values for the candidate image, rather than requiring evaluation of the entire candidate image. The number of image filters used to identify distinguishing feature values can be less than the number of image feature values identified for positive images, which reduces the computing resources needed and time required to create a model using the image filters (e.g., relative to the time and computing resources required to create the model using all of the image feature values).

Embodiments of the subject matter described in this specification can be used to learn a set of decision tree splits that each correspond to a particular part in a deformable parts model. Multiple different part filters (e.g., image filters for a part) can be trained in each split, and the part filter that meets an object detection objective (e.g., will provide at least a threshold level of discrimination between positive images and negative images) can be selected. In some implementations, each additional part filter is added to the tree while maintaining any part filters that have already been selected for other nodes (e.g., ancestor nodes) in the tree. The leaves of the learned tree will correspond to deformable parts model mixture templates.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
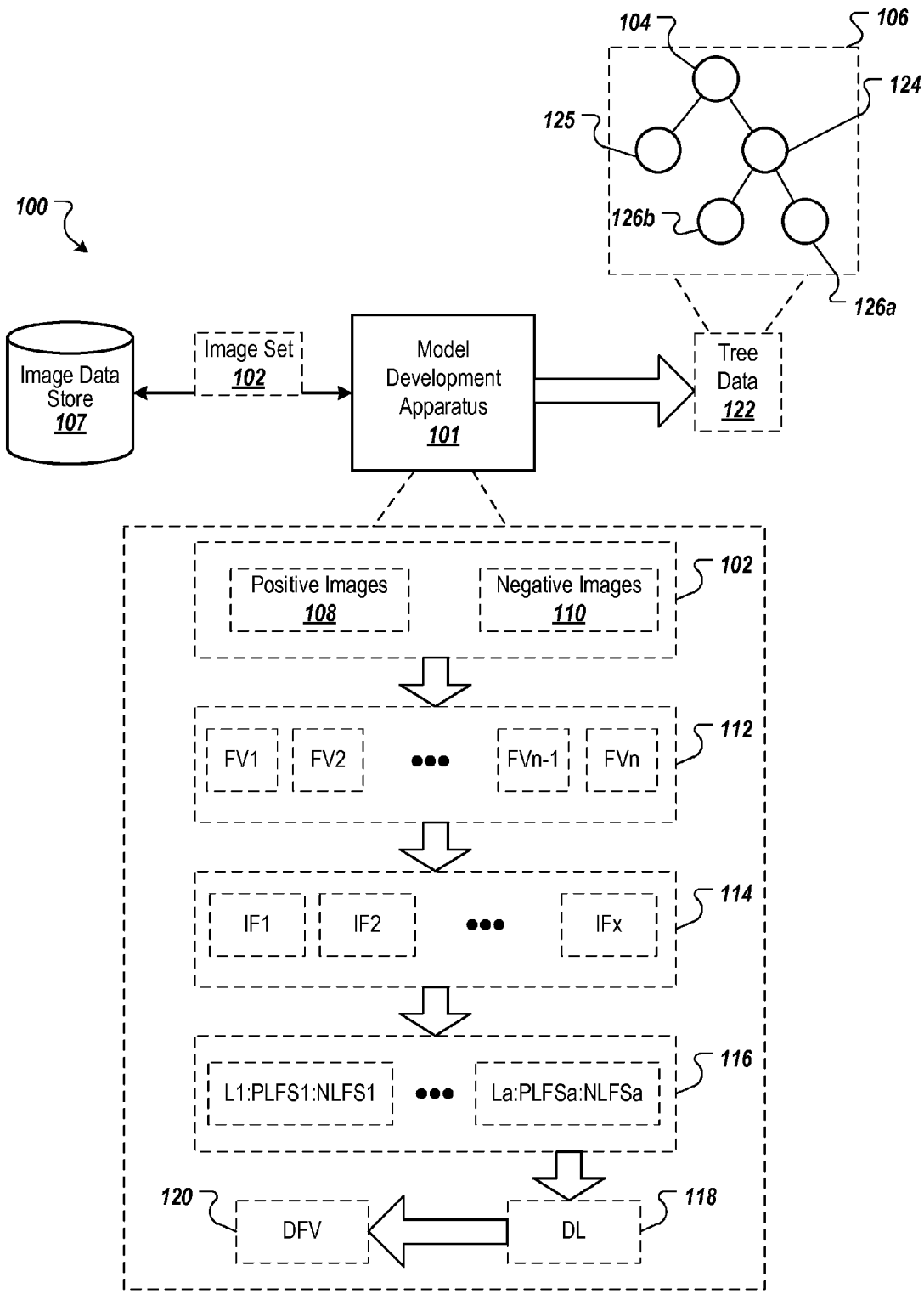
FIG. 1 is a block diagram of an example data flow for training an object identifier.

FIG. 1 is a block diagram of an example data flow 100 for training an object identifier. The data flow 100 begins with the model development apparatus 101 identifying a set of images 102 for a root node 104 of a decision tree 106. The set of images 102 can be, for example, images that have been indexed for an image search system, publicly accessible images in an online photo sharing community, or other images that are accessible over a network. The set of images 102 can be identified, for example, from an image data store 107 that stores references to images, the images, and/or image feature values that represent visual characteristics of the images.

In some implementations, the set of images 102 can include a set of positive images 108 and a set of negative images 110. The set of positive images 108 can be images that have been deemed to include a particular object, while the set of negative images 110 can be images that have been deemed to not include the particular object. For example, the set of positive images 108 can be images that have been identified as containing an image of a car, while the set of negative images 110 can be images that have been identified as not including an image of a car.

The model development apparatus 101 obtains corresponding image feature values 112 (e.g., FV1-FVn) for images in the set of images 102. In some implementations, the model development apparatus 101 obtains the image feature values 112 from the image data store 107. For example, the image feature values 112 for each of the images may have been previously identified and stored in the image data store 107 with a reference to the image from which the image feature values 112 were obtained.

In some implementations, the model development apparatus 101 obtains the corresponding image feature values 112 by extracting the image feature values from the images in the set of images 102. For example, the model development apparatus 101 may analyze each image and identify Histogram of Oriented Gradients ("HOG") feature descriptors as the image feature values 112 for each image. Other image feature values can be used to represent the images. For example, edge orientation histograms, scale-invariant feature transform descriptors, or other image feature values can be used to represent the images. Throughout this document, image feature values for the positive images are referred to as positive image feature values, while image feature values for the negative images are referred to as negative image feature values.

Multiple sets of image feature values can be obtained for each of the images. In some implementations, each set of image feature values for a particular image can be the image feature values for a different portion (e.g., a proper subset) of the image. For example, as described in more detail below, an image can be segmented into a set of M×M image cells (where M is an integer number of pixels), and the image feature values (e.g., HOG feature descriptors) can be obtained for each M×M image cell. Additionally, the image feature values can be obtained for the image at different resolutions.

The model development apparatus 101 also obtains a set of image filters 114 (e.g., IF1-IFx) for multiple image locations within the positive images. As used throughout this document, an image location refers to a portion of an image, and is not limited to a single pixel location. For example, a particular image location can be a particular N×N pixel portion of an image, where N is an integer number of pixels that can differ from M.

An image filter is a set of image feature values used to evaluate visual characteristics of an image. In some implementations, an image filter for a particular location in the positive images is a set of image feature values derived from the positive image feature values at the particular location. For example, as described in more detail below, the image feature values for a particular location (e.g., a particular N×N cell or set of N×N cells) of multiple different positive images can be clustered based on similarity to identify sets of positive image feature values that are representative of the visual characteristics of positive images. These sets of positive image feature values can be designated as the set of image filters 114 representing image feature values of portions of the positive images (e.g., the particular N×N cell). As discussed in more detail below these image filters can be used to identify location specific image feature values that distinguish positive images from negative images.

In some implementations, the set of image filters 114 may have been previously identified and stored in the image data store 107. In these implementations, the model development apparatus 101 can obtain the image filters 114 from the image data store 107.

Using the set of image feature values 112 and the set of image filters 114, the model development apparatus 101 determines sets of location feature scores 116 for multiple different locations in the images from the set of images 102. In some implementations, the sets of location feature scores 116 include, for each image filter (e.g., IF1-IFx) and each different location (e.g., L1-La), a positive location feature score (e.g., PLFS1-PLFSa) obtained by applying the image filter to one or more positive images and a negative location feature score (e.g., NLFS1-NLFSa) obtained by applying the image filter to one or more negative images.

For each particular image location, the positive location feature score is a value indicating a measure of similarity between an image filter (e.g., IF1) and positive image feature values (i.e., image feature values for positive images) at the particular image location. For example, the positive location feature score can be based on a dot product of the image filter and positive image feature values at the particular location. The negative location feature location score is a value indicating a measure of similarity between the image filter (e.g., IF1) and negative image feature values (i.e., image feature values for negative images) at the particular image location. For example, the negative location feature score for a particular location can be based on a dot product of the image filter and negative image feature values at the particular location. As discussed in more detail with reference to FIG. 3, positive and negative location feature scores can be determined using each image filter and the positive and negative image feature values at each different image location in the positive and negative images.

Using at least a portion of the sets of location feature scores 116, the model development apparatus 101 identifies a distinctive location 118 (DL). The model development apparatus 101 can identify the distinctive location 118 based on differences, at each particular location, between the positive location feature score for the particular location and the negative location feature score for the particular location. In some implementations, the model development apparatus 101 can identify the particular location at which a difference between the positive location feature score and the negative location feature score meets a difference threshold. For example, the model development apparatus 101 can identify the particular location for which a difference between the positive location feature score and the negative location feature score is the highest (e.g., among the sets of location feature scores 116) as the distinctive location 118.

When multiple image filters are used to generate sets of location feature scores 116, the differences between the positive location feature scores and the negative location feature scores can be evaluated on a per-image-filter basis. For example, assume that image filter IF1 and image filter IF2 were each used to generate positive and negative location feature scores. In this example, the image location at which the difference between the positive and negative location feature scores generated using image filter IF1 meets a threshold (e.g., is highest) can be identified as a candidate distinctive location. Similarly, another candidate distinctive location can be the image location at which the difference between the positive and negative location feature scores generated using image filter IF2 meets a threshold (e.g., is highest). In some implementations, the candidate image location corresponding to the highest (or some other threshold) difference in positive and negative location feature scores (e.g., for any image filter) is selected as the distinctive location 118.

The model development apparatus 101 selects a set of distinguishing feature values 120 (DFV) for the distinctive location 118. As described in more detail below, the positive image feature values at the distinctive location are used to select the distinguishing feature values 120 for the distinctive location 118. For example, the positive image feature values that produced the highest positive location feature score at the distinctive location 118 can be used to adjust the image filter with which the highest positive location feature score at the distinctive location 118 was obtained. This adjusted image filter can then be designated the set of distinguishing feature values 120 for the distinctive location 118. In some implementations, the positive image feature values that produced a highest positive location feature score at the distinctive location 118 can be selected as the distinguishing feature values 120 for the distinctive location In some implementations, the model development apparatus 101 uses the set of distinguishing feature values 120 for the distinctive location 118 as an image filter 114 and can again repeat at least a portion of the above described process to refine the distinctive location and/or update the distinguishing feature values 120 for the distinctive location 118. This process can iterate until a change in the distinctive location and/or the distinguishing feature values 120 for the distinctive location 118 fails to meet a threshold change, until a specified number of iterations have been completed, or until some other stop condition is reached (e.g., a maximum elapsed time).

Using the set of distinguishing feature values 120, the model development apparatus 101 can generate tree data 122 that define a decision tree. In some implementations, the set of distinguishing feature values 120 and the distinctive location 118 can be used as the basis of a split rule for creating descendent nodes of the decision tree. For example, the model development apparatus 101 can use the distinguishing feature values 120 and the distinctive location 118 to identify images (or portions of images) for which a measure of similarity between the image feature values at the distinctive location and the distinguishing feature values meets a threshold similarity value. In turn, the model development apparatus 101 can create a positive descendent node 124 that includes the identified images (or portions of images).

The split rule used to create the positive descendent node can be considered an additional image filter, and a series of split rules used to create positive descendent nodes can be used to define a deformable parts model. The model development apparatus 101 can also create a negative descendent node 125 that includes images (or portions of images) from the root node 104 that were not included in the positive descendent node 124. The model development apparatus 101 can repeat at least a portion of the operations described above to create additional descendent nodes 126a, 126b using at least the images in the positive descendent node 124.

In some implementations, a single image (or portion of an image) can be included in both the positive descendent node 124 and the negative descendent node 125. For example, assume that a particular image (or portion of an image) has a measure of image similarity that does not meet the threshold similarity value, but is within a specified value of the threshold similarity value. In this example, it is possible that the particular image (or the portion of the image) includes a representation of the object (e.g., a blurry image of the object or a brighter or dimmer image of the object) that results in a lower image similarity score than other representations of the object. However, further analysis of the image (or portion of the image) using additional image filters may reveal that the image (or the portion of the image) includes the object.

In some implementations, the model development apparatus 101 can also repeat operations described above for one or more images (or portions of images) that are included in a negative descendent node, and the positive descendent node that is created from the negative descendent node can be part of a deformable parts model. When a split rule is determined for a negative descendent node, the split rule identified for its parent node is not included in a deformable parts model defined by the negative descendent node, but the split rules for any more senior (e.g., grandparent or great grandparent) positive nodes to which the negative descendent node is related can be used as part of the deformable parts model defined by the negative descendent node.

To illustrate, assume that node 126b is a negative descendent node from the positive descendent node 124. In this example, operations described above can be performed for node 126b, and a deformable parts model defined at the positive descendent node for node 126b will be based on the split rules for the negative descendent node 126b and the root node 104, but will not include the split rule for node 124.

In some implementations, the identification of a split rule at any level of the decision tree 106 is based on a sum of the scores for all image filters (e.g., split rules) that have been selected for the positive nodes between the current node at the current level and the root node. Thus, the split rule for the current node will be selected to discriminate between positive and negative images takes into account the previously identified discriminative feature values when selecting a new set of discriminative feature values. Thus, the decision tree is constructed to represent a deformable parts model.

As additional descendent nodes are created, the number of images in each of the descendent nodes will be reduced. Thus, fewer positive images will generally be included in the nodes as the descendent nodes are traversed. In some implementations, the identification of additional descendent nodes in a particular branch of the decision tree 106 can end when fewer than a threshold number of positive images are included in a descendent node.

For any particular node of the decision tree, the split rules for each node traversed to reach the particular node from the root node will define an object identifier. For example, assume that node 126a is a final positive descendent node for the decision tree 106, and that the positive images used to train the decision tree 106 were images deemed to include cars. In this example, the split rules for nodes 104 and 124 (e.g., the distinguishing feature values and distinctive location that were identified for the images in each of the nodes 104 and 124) can be used to determine whether another image is an image of a car. In particular, if the measure of similarity between the image feature values of the image at the distinctive location for node 104 and the distinguishing image feature values corresponding to node 104 meet the threshold specified for node 104, and the measure of similarity between the image feature values of the image at the distinctive location for node 124 and the distinguishing image feature values corresponding to node 124 meet the threshold specified for node 124, then the image can be considered to be an image of a car.

The split rules for a series of positive descendent nodes can define a deformable parts model for an object (or set of objects). For example, the split rule for each of the positive descendent nodes can be an image filter for an object part, and the set of split rules for a series of descendent positive nodes can be used to identify the object (or the set of objects) in the same manner as a deformable parts model.

In some implementations, the split rules for a series of positive descendent nodes in the decision tree 106 can be used to initialize a deformable parts mixture model for further training. For example, each of the distinguishing feature values and distinctive locations used to create a series of positive descendent nodes can be identified as initial feature values for parts in the deformable parts model, and training of the deformable parts mixture model can be performed based on these initial feature values for the parts. The resulting deformable parts mixture model can then be used for object identification.

For brevity, this document refers to an image and identification of an object in an image. The operations described in this document can be performed on portions of images (e.g., N×N pixel portions of images) and can be used to identify the presence of multiple different objects in a single image.

Figure 2:
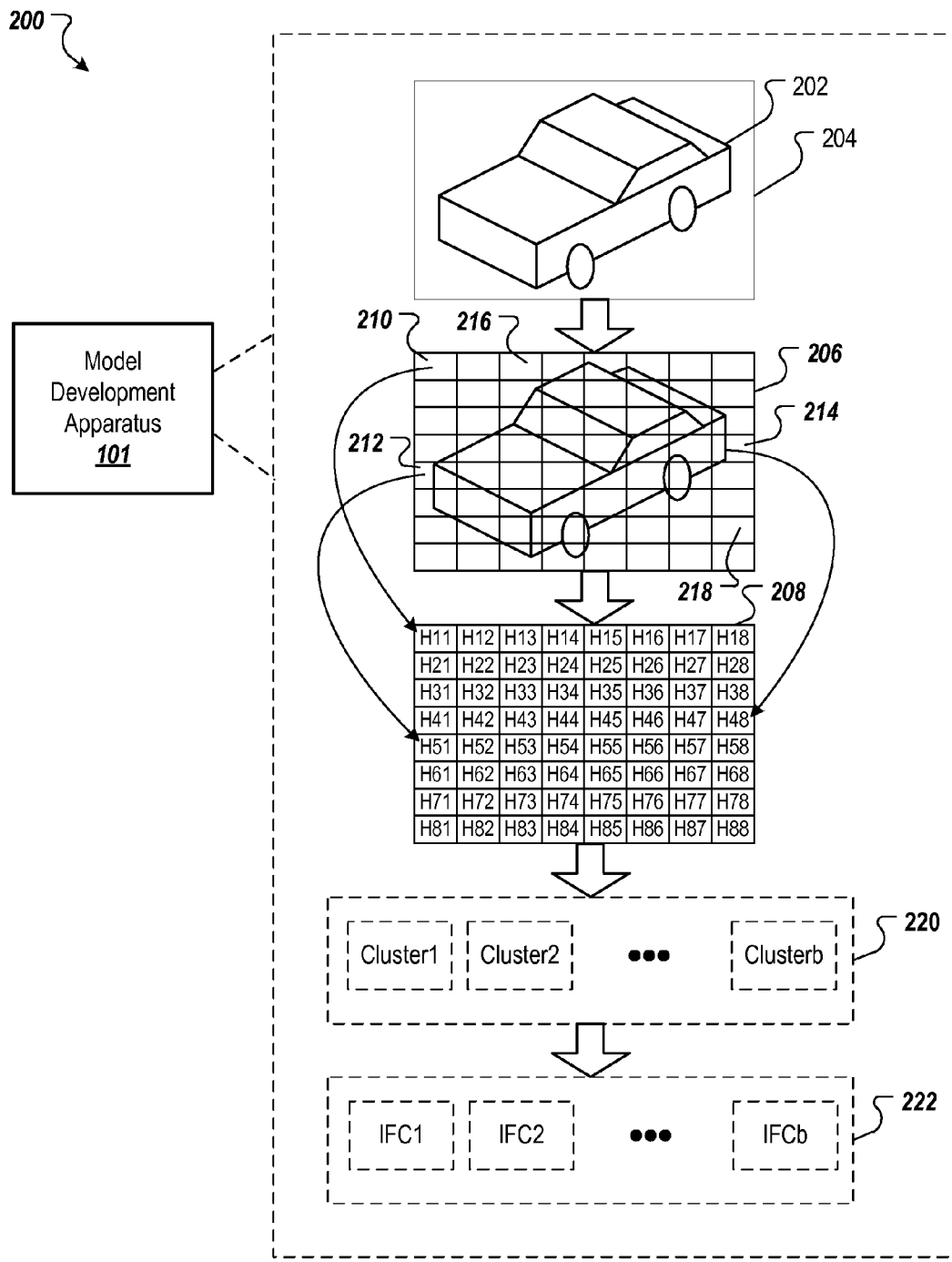
FIG. 2 is a block diagram illustrating an example data flow for identifying image filters.

FIG. 2 is a block diagram illustrating an example data flow 200 for identifying image filters. In the data flow 200, the model development apparatus 101 receives a positive image 202. Positive images are images that have been identified as images of a particular object. In the data flow 200, the positive image 202 is an image of a car. The positive image 202 can be identified as an image of a car, for example, based on one or more labels (e.g., text descriptors) that have been assigned to the positive image 202. For example, users may have submitted text identifying the image as an image of a car.

The positive image 202 is bounded by a bounding box 204. The bounding box 204 can be, for example, a border used to distinguish the particular object from other objects in an image. For example, assume that the image of the car was part of a larger image that included the Eiffel Tower. In this example, the bounding box 204 may be used to distinguish the portion of the larger image in which the car was presented. The bounding box may be identified based on user feedback. For example, users may have been asked to specify the location of the car in the larger image using a rectangular bounding box, and the rectangular bounding boxes specified by the users can be used to create the bounding box 204.

In some implementations, the model development apparatus 101 segments the positive image 202 into a set of M×M image cells 206. Each of the image cells can be a square having sides that are M pixels long, where M is an integer number of pixels.

For each of the M×M image cells 206, the model development apparatus 101 obtains image feature values 208. In some implementations, the image feature values for each M×M image cell are HOG feature descriptors (e.g., H11-H88, where Hij represents the HOG feature descriptors of the image cell located at the ith row and the jth column of the image) for portions of the image presented in the M×M image cell. For example, the image feature values for the image cell 210 can be a set of HOG feature descriptors specified by H11. Similarly, the image feature values for image cell 212 can be represented by the set of HOG feature descriptors specified by H51, and the image feature values for the image cell 214 can be represented by the HOG feature descriptors specified by H48. Note that image feature values can be extracted for the image at different resolutions, and different size M×M cells can be used for feature value extraction, for example, to identify feature values for coarse visual features and less coarse visual features.

The model development apparatus 101 can identify image feature values for each positive image in a set of images in a manner similar to that described above. Therefore, it is possible that the number of image feature values identified for the positive images will greatly exceed the number of image filters that will be used by the model development apparatus 101. For example, it is possible that over 100,000 image feature values (or some other number of image feature values) will be identified for the positive images, while the model development apparatus 101 may be configured to create a model using several thousand (or some higher or lower number of) image filters. Using fewer image filters than the number of image feature values identified for the positive images will reduce the computing resources needed and time required to create a model using the image filters.

In some implementations, the model development apparatus 101 may create clusters of image feature values 210 with which image filters are created in order to identify image filters. For example, clustering image feature values can facilitate identification of candidate image filters that will discriminate between positive and negative images, and these candidate image filters can be used to initialize image filters at each level of the decision tree.

As illustrated by FIG. 2, the image cells 212 and 214 are visually similar. Therefore, the image feature values for these cells (e.g., H51 and H48) may be sufficiently similar (e.g., based on a nearest neighbor analysis, cosine distance measure, or some other measure of similarity) be included in a same cluster (e.g., Cluster1) with the image feature values of other image cells having image feature values that are deemed sufficiently similar to the image feature values in the cluster. Similarly, the image cells 210, 216, and 218 are visually similar. Therefore, the image feature values for these cells (e.g., H11, H13, and H78) may be sufficiently similar (e.g., based on a nearest neighbor analysis, cosine distance measure, or some other measure of similarity) be included in a same cluster (e.g., Cluster 2) with the image feature values of other image cells having image feature values that are deemed sufficiently similar to the image feature values in the cluster. The model development apparatus 101 can create multiple different clusters, cluster image feature values into the clusters, and/or merge the clusters until the set of remaining clusters 220 includes a number of image filters that will be used by the model development apparatus 101.

For example, assume that 100,000 different image feature values have been identified for the set of positive images and that 2,000 image filters will be used to create the model. In this example, each different image feature value can initially be considered a different cluster. Using nearest neighbor analysis, agglomerative clustering, or some other technique, the 100,000 different clusters can be iteratively combined until the number of remaining clusters reaches b clusters (e.g., Cluster1-Clusterb), where b is less than 100,000, e.g., 2,000, for example. Note that the specific numbers of clusters provided are for purposes of example only, and that any other numbers can be used.

The model development apparatus 101 obtains image feature values from each cluster in the set of remaining clusters 220 and identifies a set of image filters 222 based on the image feature values. For example, a different image filter (e.g., IFC1-IFCb) can be created for each different cluster (e.g., Cluster1-Clusterb) in the set of remaining clusters 220.

In some implementations, the image filter for a particular cluster is identified based on a function of the image feature values that are included in the cluster. For example, IFC1 for Cluster1 can be based on an average (or another measure of central tendency) of the image feature values that are included in cluster1. In another example, each time that two clusters are merged, as described above, the image feature values for one of the clusters can be discarded, and the image feature values for the other cluster can be maintained. In this example, after each merge of two clusters, a single set of image feature values will be maintained in the merged cluster. In this example, once the number of clusters reaches the desired number of image filters, the image feature values for each of the clusters can be identified as an image filter.

Each image filter can also be associated with image location data. In some implementations, each image filter is associated with image location data specifying the location of one or more of the M×M image cells. For example, the image location data for image filter IFC1 can be associated with data specifying each M×M image cell having image feature values that were included in Cluster1. For example, assume that the image feature values H51 and H48 were included in Cluster1, as discussed above. In this example, image filter IFC1 can be stored with a reference to the image locations of image cells 212 and 214. These locations can be used, for example, to identify image locations that will be evaluated using each of the image filters, as described in more detail with reference to FIG. 3.

Figure 3:
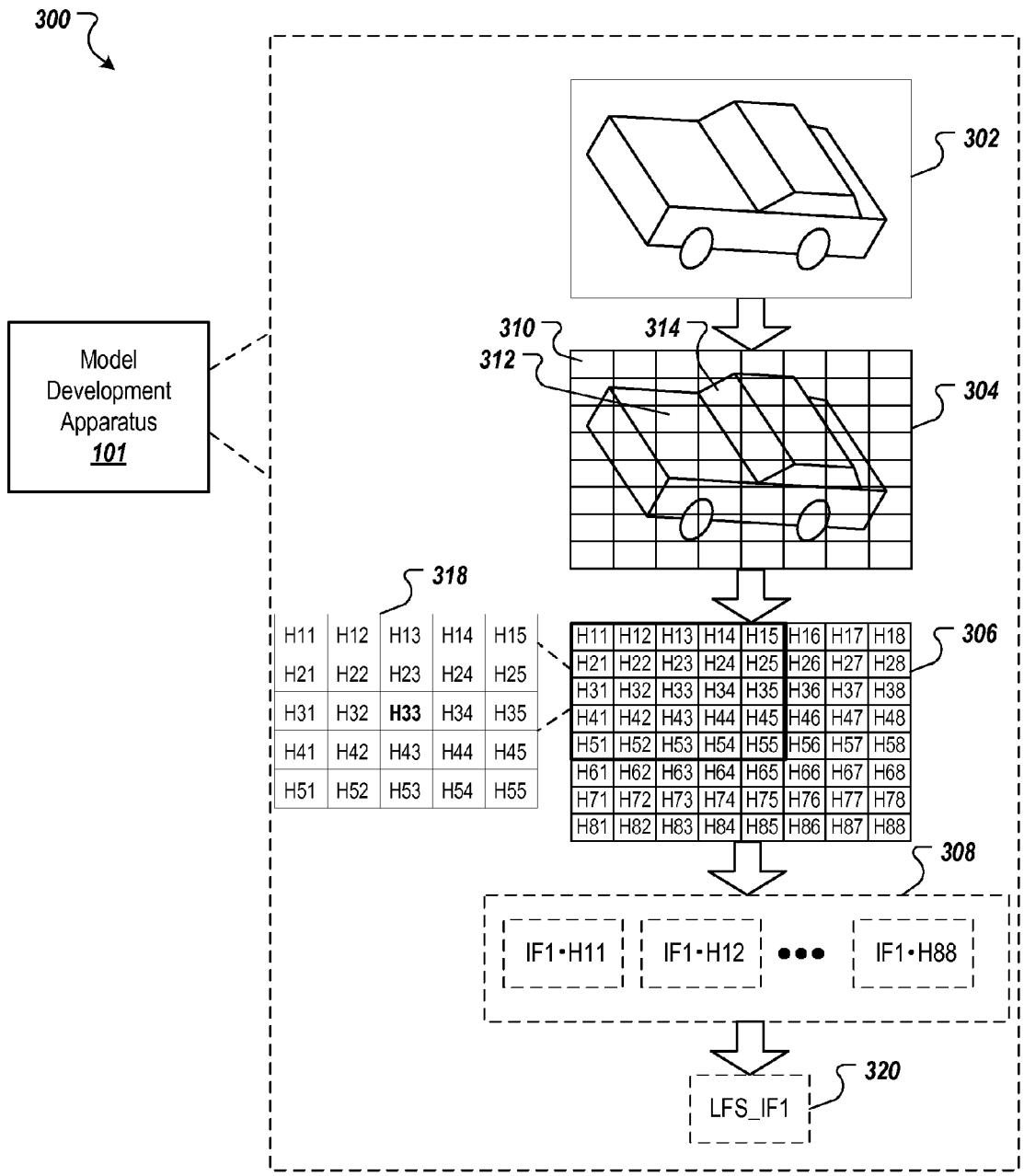
FIG. 3 is a block diagram of an example data flow for generating location feature scores.

FIG. 3 is a block diagram of an example data flow 300 for generating location feature scores. The data flow 300 begins with the model development apparatus 300 receiving an image 302. In FIG. 3, the received image is a positive image (e.g., an image of a car), but the image could also be a negative image (e.g., an image that does not include a car). The image 302 is similar to the positive image 202, but the car depicted in image 302 is from a different perspective than the image 202. Thus, even though the two images are similar, it may be that image feature values similar to those identified at a particular image location in image 202 are at a different image location in image 302. As described in more detail below, the model development apparatus 101 can still identify similarities between images 202 and 302 using the image filters, even when the image locations of similar image feature values for the two images differ.

The model development apparatus 101 segments the image 302 into a set of image cells 304, in a manner similar to that discussed above with reference to FIG. 2. For example, the model development apparatus 101 can segment the image 304 into a set of N×N cells, where N can be any integer number of pixels. For purposes of example, the image 302 has been segmented in the same manner as the image 202 from FIG. 3, but the image 302 can be segmented using a different number of image cells and/or image cells of different dimensions than those presented.

The model development apparatus 101 obtains image feature values 306 for the image cells 304. For example, as described above with reference to FIG. 2, the model development apparatus 101 can obtain HOG feature descriptors or other image feature values for each N×N image cell.

The model development apparatus 101 applies an image filter (e.g., IF1) to the image feature values 306 to determine a set of similarity measures 308 that includes measures of similarity between the image filter and the image feature values. In some implementations, the application of the image filter to the image feature values includes computing a dot product of the image filter (e.g., IF1) and the image feature values for each image cell (e.g., H11-H88). For example, one measure of similarity can be computed based on the dot product IF1•H11, which represents a measure of similarity between image filter IF1 and the image feature values H11 representing the visual features of image cell 310. For each image filter being used to evaluate the image 302, a measure of similarity (e.g., a dot product, cosine distance, or another measure of similarity) can be computed based on the image filter and the image features values for each image cell, and each of these measures of similarity can be included in the set of similarity measures 308.

In some implementations, the image location data that is associated with a particular image filter can be used to limit the image feature values to which the image filter is applied. For example, assume that a particular image filter is associated with (e.g., stored with data referencing) image location data indicating that the image filter represents image feature values for image cell 312 in positive images (e.g., the image cell located at the third row and third column in positive images). One way of analyzing the image 302 would be to apply the particular image filter only to the image features values for image cell 312 (e.g., H33) to identify a measure of similarity between the image filter and the image feature values for image cell 312. However, limiting the application of the image filter to the image feature values H33 may not accurately indicate the similarities between the image 302 and the image filter.

As noted above, the perspective of image 302 differs from that of image 202, such that similar features between the two images may be at different locations in the image. For example, the visual characteristics of the image in the image cell at the third row and third column of image 202 are more similar to the visual characteristics of image cell 314 than the visual characteristics of image cell 312 in FIG. 3. Identification of these similarities may require application of the image filter to the image feature values for other image cells beyond the image cell from which the image filter was obtained.

In some implementations, the model development apparatus 101 applies an image filter to a proper subset of the image feature values (e.g., image feature values 316) for an image. The proper subset of the image feature values can be, for example, image feature values for a set of image cells that are within a threshold distance (e.g., number of image cells or number of pixels) relative to the image location that is associated with a particular image filter. For example, continuing with the example above, assume that the image filter has image location data corresponding to the image cell 312 and that the model development apparatus 101 has been configured to apply the image filter to the image feature values for each image cell that is within two image cells of the image cell 312. In this example, the model development apparatus 101 will apply the image filter to the set of image feature values 318 to obtain a set of similarity measures 308 for this image filter.

Note that due to clustering techniques (or other similarity techniques) that may be used to create the image filters, it is possible for multiple image locations to be associated with a particular image filter. The application of the image filter can be repeated for each of those image locations in a manner similar to that described above.

The model development apparatus 101 selects a location feature score 320 for the image filter (e.g., LFS_IF1) based on the set of similarity measures 308. In some implementations, the model development apparatus selects, as the location features score 320, the highest measure of similarity among the set of similarity measures 308 for the image filter. For example, assume that the measure of similarity computed using the image feature values H24 was the highest similarity score for image filter IF1. In this example, the similarity measure computed using the image feature values H24 (or some value based on the similarity measure) could be selected as the location feature score for image filter IF1.

Other similarity measures (instead of or in addition to the highest similarity measure) can be used to determine the location feature score 320. For example, the location feature score for image filter IF1 can be computed based on a function of each similarity score and the proximity of the image cell from which the image feature values were obtained relative to the image location associated with the image filter.

In some implementations, multiple different location feature scores can be selected for a single image. For example, for a different location feature score can be determined for each similarity measure that is computed. Each of the different location feature scores can be associated with (e.g., stored with a reference to) image location data identifying an image cell (or another type of image location) from which the image feature values used to compute the location feature score were obtained. Thus, image feature scores for similar image locations can be directly compared.

When the location feature score 320 is computed using image feature values for a positive image, the location feature score 320 is referred to as a positive location feature score. When the location feature score 320 is computed using image feature values for a negative image, the location feature score 320 is referred to as a negative location feature score. As described in more detail with reference to FIG. 4, a set of positive location feature scores and negative location feature scores for a particular image filter can be used to identify a distinctive location for identifying the object that is included in the image.

Figure 4:
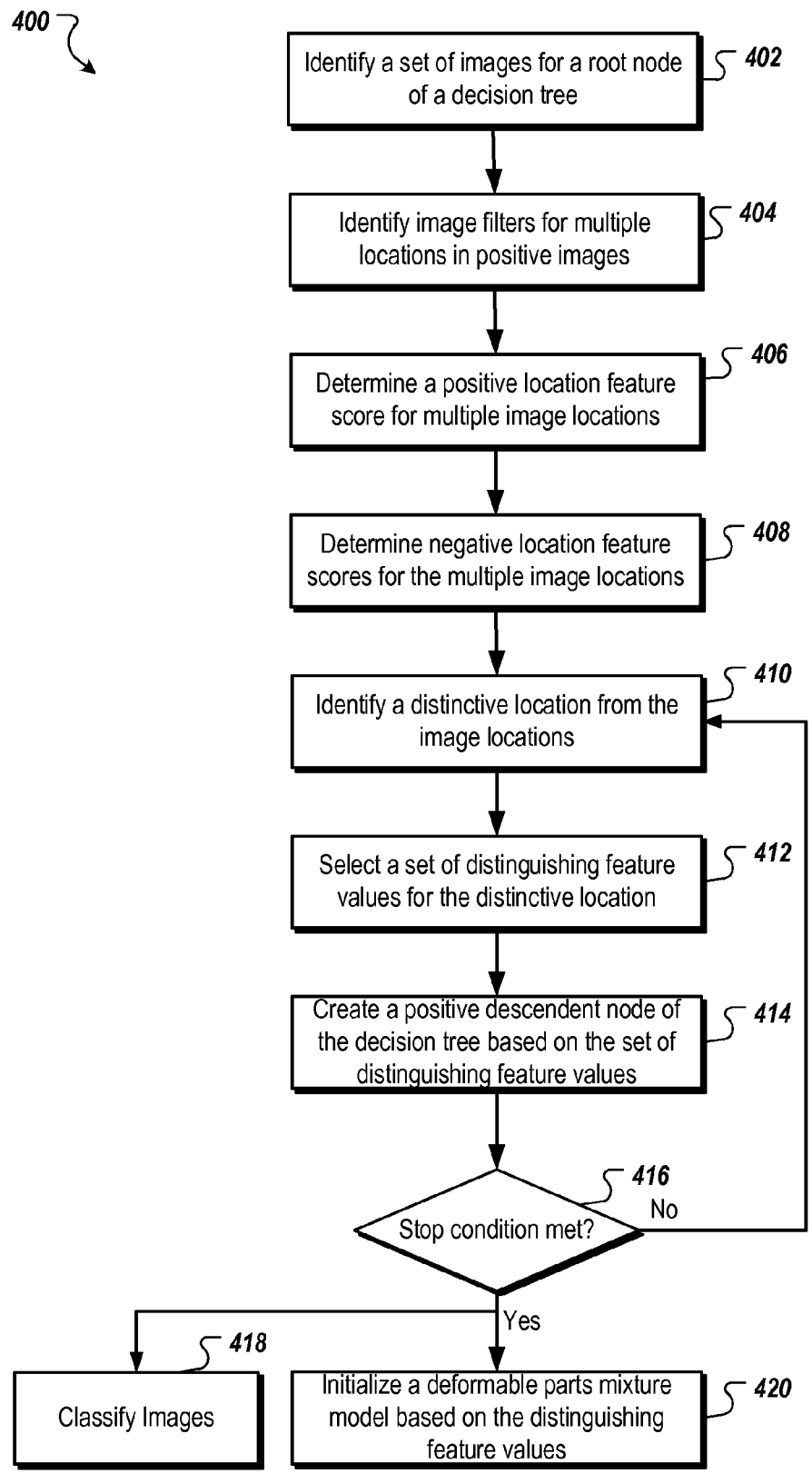
FIG. 4 is a flow chart of an example process for creating an object identification model.

FIG. 4 is a flow chart of an example process 400 for creating an object identification model. The process 400 can be performed, for example, by the model development apparatus 101 or another data processing apparatus. The process 400 can also be implemented by executing instructions stored on a non-transitory computer storage medium, where execution of the instructions cause a data processing apparatus to perform the operations of the process 400.

A set of images for a root node of a decision tree are identified (402). As described above with reference to FIG. 1, the image can be identified from a corpus of images or image data stored in an image data store, and each image has a set of image feature values that represent visual characteristics of the image.

In some implementations, the set of images includes both positive images and negative images for a particular object. As discussed above, positive images are images that have been deemed to include the particular object and negative images are images that have been deemed to not include the particular object.

Image filters are identified for multiple locations in positive images (404). In some implementations, an image filter for a particular image location represents visual features of a particular image location in positive images. As discussed above, a particular image location of an image can be an M×M pixel portion of the image. Identification of image filters is discussed in detail above with reference to FIG. 2.

A positive location feature score is determined for multiple different image locations (406). As discussed above with reference to FIG. 3, a positive location feature score for a particular image location is determined based on a measure of similarity between the image filter and the positive image feature values for the particular image location in the positive image.

A negative location feature score is determined for multiple different image locations (408). A negative location feature score can be determined based on a measure of similarity between the image filter and the negative image feature values for the particular location in the negative image. The negative location feature score can be determined in a manner similar to that described above with reference to FIG. 3.

A distinctive location is identified from among the multiple image locations (410). In some implementations, the distinctive location is identified based on a difference between the positive location feature scores and the negative location feature scores. For example, assume that applying a particular image filter at a particular image location of positive images results in a positive location feature score of 0.7 and that applying the image filter to the particular image location in negative images results in a negative location feature score of 0.4. In this example, the difference between the positive location feature score and the negative location feature score will be 0.3 (i.e., 0.7–0.4). Further assume that using a different image filter at a second different image location results in a positive location feature score of 0.7 and a negative location feature score of 0.5. Thus, the difference between the positive and negative location feature scores for the second image location is 0.2 (i.e., 0.7–0.5). In this example, first image location can be selected as the distinctive location since the difference between the positive location feature score and the negative location feature score at the first image location is greater than the difference between the positive location feature score and the negative location feature score at the second image location.

In some implementations, the distinctive location is an image location at which the difference between positive location feature scores and negative location feature scores generated using any of the image filters. For example, assume that location feature scores were generated using multiple different image filters. In this example, the image location at which any of the image filters resulted in a maximum difference (or at least a threshold difference) between the positive location feature score and the negative location feature score.

As described below, the combination of the distinctive location and the distinguishing feature values for the distinctive location can define a part filter for a deformable parts model. The defined part filter can be selected to provide a greatest (or threshold level) of separation between the positive images and the negative images.

A set of distinguishing feature values are selected for the distinctive location (412). As described above with reference to FIG. 1, the positive image feature values that produced a highest positive location feature score (or some other specified positive location feature score) at the distinctive location 118 can be selected as the distinguishing feature values for the distinctive location. Alternatively, the positive image feature values that produced the highest positive location feature score (or some other positive location feature score) at the distinctive location can be used to adjust the image filter used to obtain the location features scores. This adjusted image filter can then be designated the set of distinguishing feature values for the distinctive location.

A positive descendent node of the decision tree is created based on the set of distinguishing feature values (414). As described above with reference to FIG. 1, the set of distinguishing feature values and the corresponding distinctive location can be used as the basis for a node split rule for a node. For example, when segmenting images in the root node, images for which a measure of similarity between the distinguishing features and image feature values at the distinctive location of the image meet a threshold similarity can be included in a positive descendent node, while other images can be included in a negative descendent node or ignored.

A determination is made whether a stop condition has been met (416). As discussed above the stop condition can specify a minimum number of positive images that must be included in a positive descendent node in order for additional descendent nodes to be created from that positive descendent node.

Another possible stop condition can be a number of descendent node levels have been created. Once the number of descendent node levels (e.g., L nodes from the root node, where L is an integer) has been reached the decision tree can be considered completed.

When the stop condition has not yet been met, the process can return to identify another distinctive location from the image locations (410). For example, the image location having a next highest difference between the positive and negative location feature scores can be selected as the next distinctive location. In this iteration, the first identified distinctive location can be removed from consideration. Additionally, when the next distinctive location is identified, the next distinctive location can be identified relative to the location of the last selected distinctive location. For example, if the first distinctive location is located at a particular image cell, the location of the second selected distinctive location can be expressed based on a difference in location between the first distinctive location and the second selected distinctive location (e.g., second distinctive location=first distinctive location+2 image cell columns-1 image cell row).

When the stop condition is determined to have been met, a deformable parts mixture model can be initialized using pairs of distinguishing feature values and distinctive locations (420). For example, each of the distinguishing feature values and its corresponding distinctive image location can be considered an initial representation of a part in the deformable parts mixture model. Therefore, the pairs of distinguishing feature values and distinctive location can be input as initial values into a deformable parts mixture model training system.

The decision tree that is created using the operations of the process 400 can also be used to classify images (418). For example, a candidate image can be evaluated at the root node to determine whether the root node distinctive location of the candidate image has image feature values that match (e.g., have at least a specified level of similarity relative to) the distinguishing feature values that were identified for the root node. If a match is determined to exist, the image can continue to be evaluated using the distinguishing feature values and distinctive location for the positive descendent node to determine whether the candidate image is an image of the particular object for which the decision tree was created.

Figure 5:
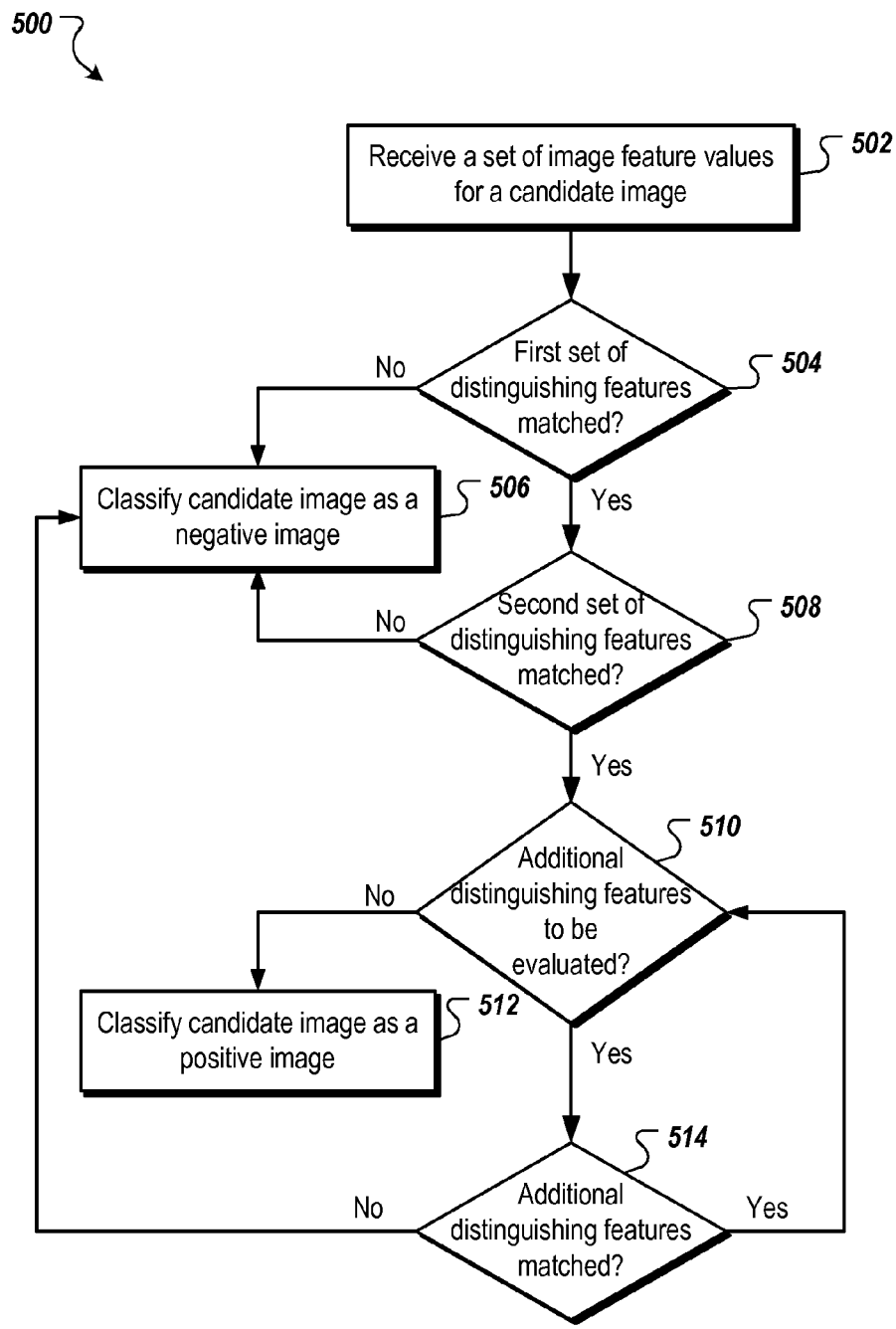
FIG. 5 is a flow chart of an example process for classifying images.

FIG. 5 is a flow chart of an example process 500 for classifying images. The process 500 can be performed, for example, by the model development apparatus 101 or another data processing apparatus. The process 500 can also be implemented by executing instructions stored on a non-transitory computer storage medium, where execution of the instructions cause a data processing apparatus to perform the operations of the process 500.

A set of image feature values are received for a candidate image (502). The set of image feature values can be image feature values for an image that is not yet been deemed as either a positive or negative image for a particular object. For example, the candidate image can be an image that may include a car, but has not yet been classified as an image of a car. The image feature values can be received, for example, from an image data store similar to that described above with reference to FIG. 1.

A determination is made whether a first set of distinguishing feature values is matched (504). As described above, the first distinguishing feature values can be associated with a root node of a decision tree that was created for identifying a particular object in images. For example, assume that a decision tree was created, in a manner similar to that described above with reference to FIG. 4, to identify the presence of a car in an image. In this example, the first set of distinguishing feature values can be the distinguishing feature values associated with a root node of that decision tree. As described above, the first distinguishing feature values can also be associated with a distinctive location.

In some implementations, the first set of distinguishing feature values are matched when at least a threshold level of similarity exists between the distinguishing feature values and image feature values for the candidate image. For example, a dot product of (or some other measure of similarity between) the distinguishing feature values and the image feature values of the candidate image can be used to determine a match score for the candidate image. If the match score meets a threshold match score, the first set of distinguishing feature value can be considered matched.

In some implementations, the match score can also be based, at least in part, on the distinctive location associated with the distinguishing feature values. For example, the match score for the candidate image can be computed using only image feature values for the image that are associated with image locations within a threshold distance of the distinctive location. Additionally, or alternatively, the match score for the candidate image can vary based on a distance of the image feature values from the distinctive location.

If the first set of distinguishing feature values is not matched, the candidate image is classified as a negative image (506). Continuing with the previous example, if the match score for the candidate image does not meet (e.g., equal or exceed) the threshold match score, the image can be considered to not include an image of a car.

If the first set of distinguishing feature values is matched, a determination is made whether a second set of distinguishing feature values is matched (508). As described above with reference to FIG. 4, the decision tree created for identifying a particular object in images can include one or more positive descendent nodes, each having a different set of distinguishing features. In some implementations, identifying an object in an image can require the image to match distinguishing feature values for multiple positive descendent nodes. Thus, the image feature values for the image can be used to determine whether the distinguishing feature values for a next positive descendent node are matched. If the second set of distinguishing feature values is not matched, the candidate image is classified as a negative image (506).

If the second set of distinguishing feature values is matched, a determination is made whether there are additional distinguishing feature values to be evaluated (510). For example, a determination can be made whether there exist additional positive descendent nodes in the decision tree. If additional positive descendent nodes exist in the decision tree, then there are additional distinguishing features to evaluate.

In some implementations, evaluation of the additional distinguishing feature values can be omitted. For example, if the threshold score for a particular split rule is below a threshold value (e.g., a pre-specified value), a negative classification can be selected rather than performing additional processing. One technique for performing such a negative classification is referred to as a classification cascade, where less processing is performed based on a trade-off between classification accuracy and utilizing additional computing resources.

If there are no additional distinguishing feature values to be evaluated, the candidate image is classified as a positive image (512). For example, if the image feature values for the image have matched the distinguishing feature values for a series of all positive nodes stemming from the root node, the image can be classified as an image that includes the particular object (e.g., an image that includes the car).

If additional distinguishing feature values are to be evaluated, a determination is made whether the additional distinguishing feature values are matched (514). The determination of whether the distinguishing feature values are matched is determined in a manner similar to that described above. If the additional distinguishing feature values are not matched, the candidate image is classified as a negative image (506). If the additional distinguishing feature values are matched, a determination can again be made whether there are still more distinguishing feature values to be evaluated (510).

Note that for brevity and clarity the description above refers to a single decision tree. The techniques described above can be used to create multiple different decision trees. For example, a randomized forest of decision trees can be created using the techniques above. In this example, each decision tree can be generated using a random (or pseudorandom) proper subset of the image filters described with reference to FIGS. 1-4. This randomized forest can then be used to classify images.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:

identifying a set of images for a root node of a decision tree, visual characteristics of each image being represented by image feature values for the image, the set of images including one or more positive images that have been deemed to include a particular object and one or more negative images that have been deemed to not include the particular object;

identifying, for each of a plurality of locations in one or more positive images from the set of images, image filters, the image filter for each location representing visual features of the location in positive images;

determining, for each of two or more image locations, a positive location feature score and a negative location feature score, the positive location feature score being determined based on a measure of similarity between the image filter and the positive image feature values for each of two or more different positive images, the negative location feature score being determined based on a measure of similarity between the image filter and the negative image feature values for each of two or more different negative images;

identifying a first distinctive location from the two or more image locations, the first distinctive location being identified based on a difference between the positive location feature score at the first distinctive location and the negative location feature score at the first distinctive location meeting a difference threshold; and selecting a first set of distinguishing feature values for identifying the particular object based on image feature values for the first distinctive location.

2. The method of claim 1, comprising:

creating a first positive descendent node of the decision tree, the first positive descendent node being created to include a proper subset of the set of images, the proper subset including the images for which image feature values, at the distinctive location, have at least a threshold similarity to the first set of distinctive feature values for the first distinctive location; and creating a first negative descendent node of the decision tree, the first negative descendent node being created to include a proper subset of the set of images, the proper subset including at least the images not included in the first positive descendent node.

3. The method of claim 2, comprising:

identifying a second set of distinguishing feature values for identifying the particular object, the second set of distinguishing feature values being associated with a second distinctive location of the images; and creating a second positive descendent node that includes a proper subset of the images from the first positive descendent node, the proper subset included in the second positive descendent node being images having both:

image feature values, at the first distinctive location, that have at least a threshold similarity to the first set of distinctive feature values for the first distinctive location; and image feature values, at the second distinctive location, that have at least a threshold similarity to the second set of distinguishing features.

4. The method of claim 3, comprising:

receiving a set of image feature values for a candidate image;

determining that image feature values for the first distinctive location of the candidate image match the first set of distinguishing feature values;

determining that image feature value for the second distinctive location of the candidate image match the second set of distinguishing feature values; and classifying the candidate image as an image of the particular object based, at least in part, on the determination that the first set of distinguishing feature values and the second set of distinguishing feature values are both matched by image feature values for the candidate image.

5. The method of claim 1, comprising initializing a deformable parts mixture model based on the first set of distinguishing feature values.

6. The method of claim 5, wherein initializing the deformable parts mixture model comprises:

identifying the first set of distinguishing feature values as a mixture component for the deformable parts mixture model; and identifying the first discriminative image location as a reference location for the mixture component.

7. A non-transitory computer storage medium encoded with a computer program, the program comprising instructions that when executed by one or more data processing apparatus cause the one or more data processing apparatus to perform operations comprising:

identifying a set of images for a root node of a decision tree, visual characteristics of each image being represented by image feature values for the image, the set of images including one or more positive images that have been deemed to include a particular object and one or more negative images that have been deemed to not include the particular object;

identifying, for each of a plurality of locations in one or more positive images from the set of images, image filters, the image filter for each location representing visual features of the location in positive images;

determining, for each of two or more image locations, a positive location feature score and a negative location feature score, the positive location feature score being determined based on a measure of similarity between the image filter and the positive image feature values for each of two or more different positive images, the negative location feature score being determined based on a measure of similarity between the image filter and the negative image feature values for each of two or more different negative images;

identifying a first distinctive location from the two or more image locations, the first distinctive location being identified based on a difference between the positive location feature score at the first distinctive location and the negative location feature score at the first distinctive location meeting a difference threshold; and selecting a first set of distinguishing feature values for identifying the particular object based on image feature values for the first distinctive location.

8. The computer storage medium of claim 7, wherein the instructions cause one or more the data processing apparatus to perform operations comprising:

creating a first positive descendent node of the decision tree, the first positive descendent node being created to include a proper subset of the set of images, the proper subset including the images for which image feature values, at the distinctive location, have at least a threshold similarity to the first set of distinctive feature values for the first distinctive location; and creating a first negative descendent node of the decision tree, the first negative descendent node being created to include a proper subset of the set of images, the proper subset including at least the images not included in the first positive descendent node.

9. The computer storage medium of claim 8, wherein the instructions cause one or more the data processing apparatus to perform operations comprising:
identifying a second set of distinguishing feature values for identifying the particular object, the second set of distinguishing feature values being associated with a second distinctive location of the images; and
creating a second positive descendent node that includes a proper subset of the images from the first positive descendent node, the proper subset included in the second positive descendent node being images having both:
image feature values, at the first distinctive location, that have at least a threshold similarity to the first set of distinctive feature values for the first distinctive location; and
image feature values, at the second distinctive location, that have at least a threshold similarity to the second set of distinguishing features.

10. The computer storage medium of claim 9, wherein the instructions cause one or more the data processing apparatus to perform operations comprising:
receiving a set of image feature values for a candidate image;
determining that image feature values for the first distinctive location of the candidate image match the first set of distinguishing feature values;
determining that image feature value for the second distinctive location of the candidate image match the second set of distinguishing feature values; and
classifying the candidate image as an image of the particular object based, at least in part, on the determination that the first set of distinguishing feature values and the second set of distinguishing feature values are both matched by image feature values for the candidate image.

11. The computer storage medium of claim 7, wherein the instructions cause one or more the data processing apparatus to perform operations comprising initializing a deformable parts mixture model based on the first set of distinguishing feature values.

12. The computer storage medium of claim 11, wherein initializing the deformable parts mixture model comprises:
identifying the first set of distinguishing feature values as a mixture component for the deformable parts mixture model; and
identifying the first discriminative image location as a reference location for the mixture component.

13. A system comprising:
a data store storing positive images for a particular object and negative images for the particular object, the positive images being images that have been deemed to include a particular object, the negative images being images that have been deemed to not include the particular object; and
one or more data processing apparatus that interact with the data store and execute instructions that cause the one or more data processing apparatus to perform operations comprising:
identifying, from the data store, a set of images for a root node of a decision tree, visual characteristics of each image being represented by image feature values for the image, the set of images including one or more positive images and one or more negative images;
identifying, for each of a plurality of locations in one or more positive images from the set of images, image filters, the image filter for each location representing visual features of the location in positive images;
determining, for each of two or more image locations, a positive location feature score and a negative location feature score, the positive location feature score being determined based on a measure of similarity between the image filter and the positive image feature values for each of two or more different positive images, the negative location feature score being determined based on a measure of similarity between the image filter and the negative image feature values for each of two or more different negative images;
identifying a first distinctive location from the two or more image locations, the first distinctive location being identified based on a difference between the positive location feature score at the first distinctive location and the negative location feature score at the first distinctive location meeting a difference threshold; and
selecting a first set of distinguishing feature values for identifying the particular object based on image feature values for the first distinctive location.

14. The system of claim 13, wherein the instructions cause one or more the data processing apparatus to perform operations comprising:
creating a first positive descendent node of the decision tree, the first positive descendent node being created to include a proper subset of the set of images, the proper subset including the images for which image feature values, at the distinctive location, have at least a threshold similarity to the first set of distinctive feature values for the first distinctive location; and
creating a first negative descendent node of the decision tree, the first negative descendent node being created to include a proper subset of the set of images, the proper subset including at least the images not included in the first positive descendent node.

15. The system of claim 14, wherein the instructions cause one or more the data processing apparatus to perform operations comprising:
identifying a second set of distinguishing feature values for identifying the particular object, the second set of distinguishing feature values being associated with a second distinctive location of the images; and
creating a second positive descendent node that includes a proper subset of the images from the first positive descendent node, the proper subset included in the second positive descendent node being images having both:
image feature values, at the first distinctive location, that have at least a threshold similarity to the first set of distinctive feature values for the first distinctive location; and
image feature values, at the second distinctive location, that have at least a threshold similarity to the second set of distinguishing features.

16. The system of claim 15, wherein the instructions cause one or more the data processing apparatus to perform operations comprising:
receiving a set of image feature values for a candidate image;
determining that image feature values for the first distinctive location of the candidate image match the first set of distinguishing feature values;

determining that image feature value for the second distinctive location of the candidate image match the second set of distinguishing feature values; and classifying the candidate image as an image of the particular object based, at least in part, on the determination that the first set of distinguishing feature values and the second set of distinguishing feature values are both matched by image feature values for the candidate image.

17. The system of claim 13, wherein the instructions cause one or more the data processing apparatus to perform operations comprising initializing a deformable parts mixture model based on the first set of distinguishing feature values.

18. The system of claim 17, wherein initializing the deformable parts mixture model comprises:

identifying the first set of distinguishing feature values as a mixture component for the deformable parts mixture model; and identifying the first discriminative image location as a reference location for the mixture component.

* * * * *